Dec. 6, 1966 L. G. JORGENSEN 3,290,201
MOTION PICTURE FILM SPLICING DEVICE
Filed Dec. 18, 1963 2 Sheets-Sheet 1
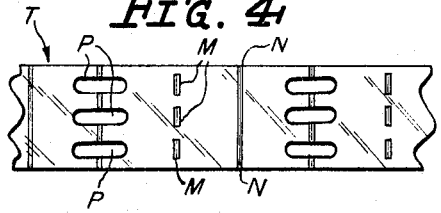
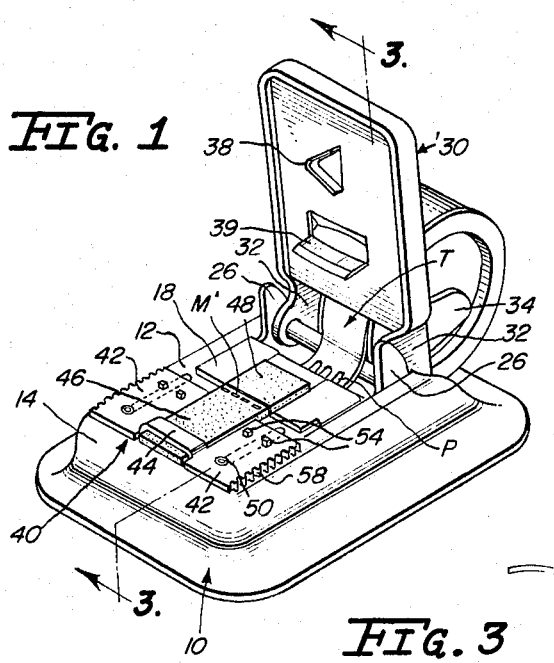
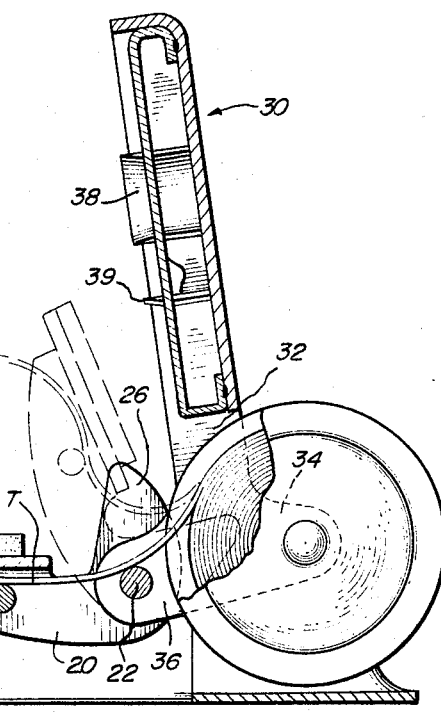
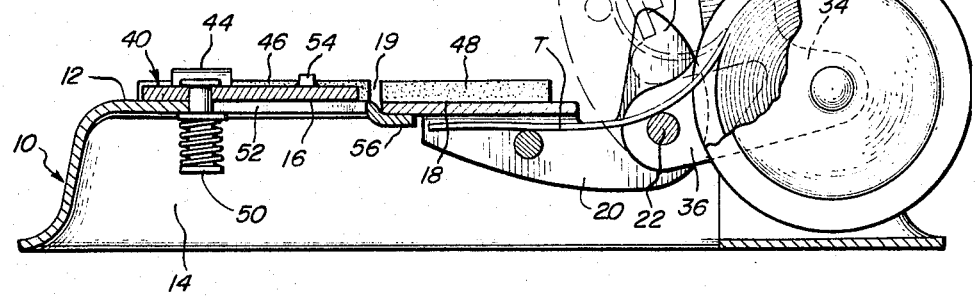
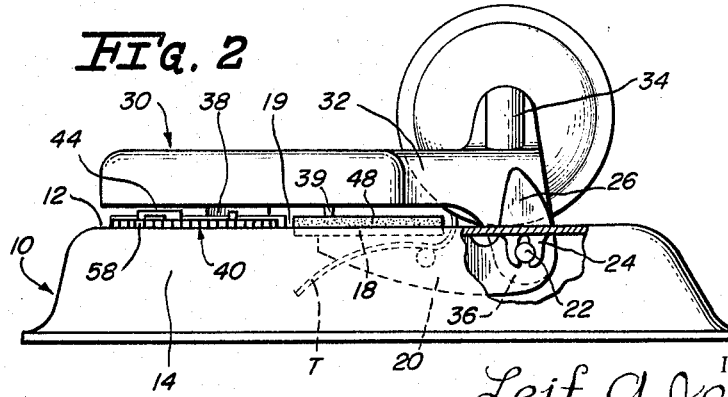
INVENTOR.
Leif G. Jorgensen
BY
Atty.

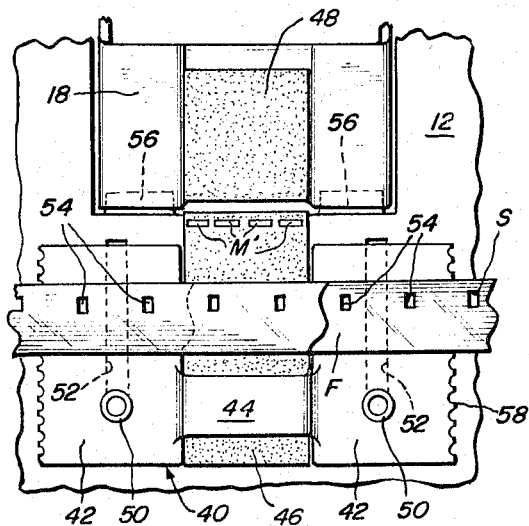
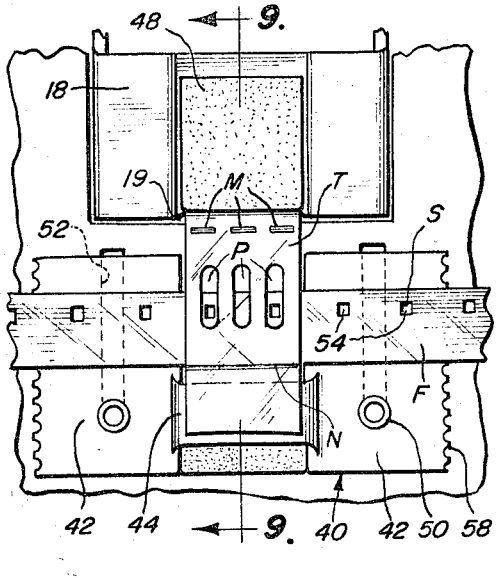
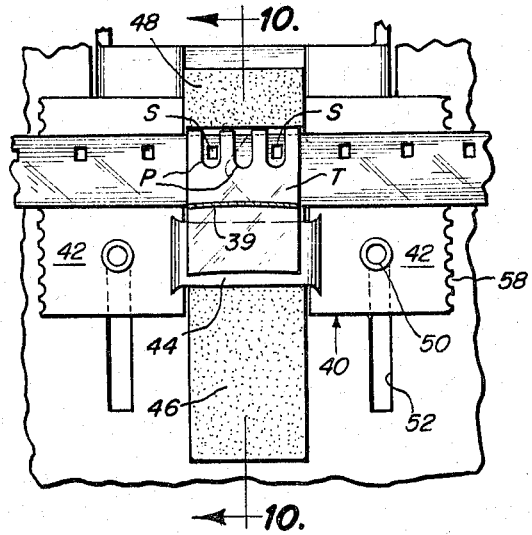
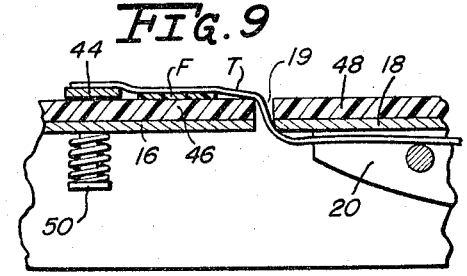
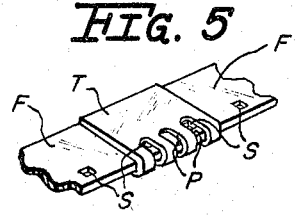

Patent text page …

United States Patent Office 3,290,201
Patented Dec. 6, 1966

3,290,201
MOTION PICTURE FILM SPLICING DEVICE
Leif G. Jorgensen, 517 W. St. Charles Road,
Lombard, Ill.
Filed Dec. 18, 1963, Ser. No. 331,575
14 Claims. (Cl. 156—505)

This invention relates to film splicing, and more particularly to a device for joining the adjacent ends of a pair of motion picture film strips by wrapping them with a band of transparent, adhesive material such as plastic tape.

The invention is related to the invention disclosed in my co-pending application, Serial No. 260,277, filed February 21, 1963, now Patent No. 3,155,563, entitled Motion Picture Film Splicing Device.

In the device disclosed in the prior application referred to above unperforated tape is used; whereas, in the device of the present invention the tape used is provided with holes arranged and disposed for alignment with the sprocket holes of the film strips to be spliced.

By utilizing perforated tape in a film splicing device the need for tape perforating means is obviated, and the device may thereby be simplified to an appreciable extent.

It is therefore an object of the present invention to provide, in a motion picture film splicing device, an arrangement utilizing perforated tape in roll stock form.

A more specific object of the invention is the provision, in a device of the type described, of a base with a horizontal deck having an opening therein, means for positioning abutting ends of the film strips to be joined on one side of the opening, means for feeding an end of the tape up through the opening and across the tape, and means for moving the film strip ends over the opening so that the tape is wrapped around the film, with the tape holes being aligned with the sprocket holes of the film.

These and other objects of the invention will be apparent from an examination of the following description and drawings, wherein:

FIGURE 1 is a perspective view of a film splicing device embodying features of the invention, with the device being shown in the open position;

FIGURE 2 is a side elevational view of the structure illustrated in FIGURE 1, with portions of the structure broken away;

FIGURE 3 is a longitudinal, vertical section taken on line 3—3 of FIGURE 1;

FIGURE 4 is a plan view of a section of perforated transparent, adhesive tape of the type employed with the film splicer illustrated in the other views;

FIGURE 5 is a perspective view of a pair of abutting film strip ends shown after they have been wrapped with a band of tape, of the type shown in FIGURE 4, by a film splicer of the type illustrated in FIGURE 1;

FIGURE 6 is an enlarged, fragmentary plan view of a portion of the structure illustrated in FIGURE 1, shown before the tape has been applied;

FIGURE 7 is a view similar to FIGURE 6, but shown after the jagged film strip ends have been trimmed and the tape applied;

FIGURE 8 is a view similar to FIGURES 6 and 7, but shown after the tape has been wrapped around the film strip ends and the excess tape has been trimmed from the side of the tape remote from the sprocket holes; and FIGURES 9 and 10 are vertical sections taken on lines 9—9 and 10—10 of FIGURES 7 and 8, respectively.

It will be understood that, for purposes of clarity, certain elements have been intentionally omitted from certain views where they are believed to be illustrated to better advantage in other views.

Referring now to the drawings for a better understanding of the invention, and particularly to FIGURE 5, it will be seen that a pair of adjacent motion picture film strip ends F—F are joined together in abutting, end-to-end relation by a band of perforated, transparent, adhesive tape T of the type shown in FIGURE 4.

As best seen in FIGURE 4, the tape T, which is preferably in roll stock form, includes a series of longitudinally spaced rows each comprising a plurality of perforations or slots P elongated lengthwise of the tape and spaced from each other transversely of the tape a distance equal to the spacing between the sprocket holes of the film.

It will also be noted that spaced longitudinally of the tape alternately between the rows of slots P are a series of transversely extending guide lines M imprinted on the tape. The function of the slots P and guide lines M will be described later in the specification.

Referring now to FIGURES 1–3 of the drawings, it will be seen that the film splicing device of the invention includes a hollow, stationary member or base 10 which is somewhat fusto-pyramidal in shape having a generally flat, horizontal upper wall or deck 12 supported by an integral, outwardly flaring, peripheral side wall 14 depending from the outer edge thereof.

As best seen in FIGURES 3 and 6, the deck is divided into a generally U-shaped stationary section 16 and a generally rectangular movable section or trap door 18, the sections complementing each other to present an over-all rectangular shape, with a slot or opening 19 extending transversely of the deck between the stationary and movable sections.

Referring now to FIGURES 2 and 3, it will be seen that the movable section or trap door 18 of the deck includes a pair of flanges 20, depending from the side edges thereof, which are pivotally connected to a horizontal shaft 22, the ends of which are mounted in a pair of brackets 24 formed integrally with and depending from the underside of the deck stationary section adjacent its rearward extremity. Thus, trap door 18 can be rotated clockwise from the closed position, shown by solid lines in FIGURE 3, to the open position, shown by phantom lines. To facilitate opening of trap door 18, flanges 20 may be provided, at their rearward extremities, with upwardly projecting handle portions 26. As will be understood from a description of the operation of the device, hereinafter described, the purpose of forming the deck in two separate sections, with one section being movable, is to facilitate the feeding of the free end of the splicing tape from the tape roll up through opening 19 and onto the film strips to be spliced.

As best seen in FIGURES 1–3, there is hinged to the rear portion of the base a cutting head 30 which is preferably rectangular in shape and disposed to overlie the deck when in closed position. Extending rearwardly from opposite sides of the cutting head are a pair of parallel, spaced arms 32 which have at their rearward extremities pairs of upwardly and downwardly projecting ears 34 and 36, respectively.

Lower ears 36 are mounted on shaft 22, to provide a pivotal connection between the base and cutting head, while upper ears 34 serve to rotatably support a roll of transparent, adhesive tape T.

Mounted on the underside of the cutting head adjacent the forward and rearward sides thereof are a pair of front and rear cutting knives or blades 38 and 39, respectively. Blade 38 is preferably V-shaped, in horizontal section; whereas blade 39 is preferably bowed slightly and extends transversely of the cutting head. The function and operation of the cutting blades will be described in detail later in the specification.

As best seen in FIGURE 1, there is mounted on the stationary section of the deck, for movement longitudinally of the deck, a film retaining and transporting carriage indicated generally at 40.

Carriage 40 includes a pair of generally thin, flat, rectangular side plates 42 which are disposed with their inboard edges spaced from each other transversely of the deck a distance equal to the width of the tape being used to join the film strips.

The outboard edges of the side plates extend almost to the side edges of the deck, and the front and rear edges of the plates extend to the front edge of the deck and to the deck opening 19, respectively. Forward portions of the plates are connected to each other by a relatively thin, flat, integral, transversely extending strip or bridge 44 which, as best seen in FIGURE 1, is elevated slightly above the upper surfaces of the plates to permit it to pass over a pair of relatively thin, flat, rectangular front and rear cutting blocks or anvils 46 and 48, respectively, which are of the same height as the plates and which are secured to the upper surface of the deck. The blocks may be formed of any partially resilient material such as hard rubber or plastic. The front and rear blocks are of the same width as the tape being used and are disposed on the medial area of the deck forwardly and rearwardly of deck opening 19, respectively, with the front block being fixed to the deck stationary section, and the rear block being fixed to the deck movable section. Thus, the side plates of the carriage pass along the outboard edges of the cutting blocks as the carriage is moved forwardly and rearwardly on the deck. In order for the carriage to travel in a predetermined path on the deck, the plates are provided with downwardly projecting pins 50 adapted to ride back and forth in slots 52, which extend longitudinally of the deck at opposite sides of the deck stationary section, to accommodate a sliding arrangement of the same general type disclosed in my co-pending application, referred to above.

Also the side plates may be provided, adjacent their forward edges, with a plurality of upwardly projecting film retaining pins 54 which are aligned and spaced from each other transversely of the plates a distance equal to the spacing of the film sprocket holes.

In order to maintain the movable section of the deck level with the stationary section, when the former is in closed position, the latter may be provided with a pair of rearwardly projecting lugs 56, best seen in FIGURE 3, which serve as a shelf to support the forward edge of the movable section.

The outboard edges of the film carriage side plates 42 may be serrated, as at 58, to make them easier to be grasped by the operator as they are moved between the first position, illustrated in FIGURES 6 and 7, and the second position, illustrated in FIGURE 8.

It will be understood that front and rear cutting blades 38 and 39 are arranged and disposed to overlie front and rear cutting blocks 46 and 48, respectively, when the cutting head is in the lowered or closed position.

Now to describe the operation of the invention, it will be understood that in the normal operation of film splicing it is necessary to trim the jagged end edges of the film strips before they can be joined properly. This is accomplished by placing the film strips on the plates of the carriage with their jagged ends overlapped a slight amount and with the retaining pins projecting through the film sprocket holes. The carriage is then moved to the first or forwardmost position, shown in FIGURE 6, and the cutting head is lowered and struck by the operator so that the front cutting blade will sever the overlapped film strip ends. It will be noted that when the film carriage is in the first position the film is disposed to extend over the front cutting block forwardly of deck opening 19.

After the severed end portions of the film strips have been removed, the film strips to be joined are replaced on the carriage plates with the adjacent ends of the respective strips, which now have complementary V-shaped end edges, disposed in abutting, end-to-end relation, and with the carriage still in the first position, as shown in FIGURE 7.

At this time trap door 18 of the deck is raised and the end of the tape is grasped by the operator and pulled up through deck opening 19, and the trap door is lowered to the closed position.

The free end of the tape is then pulled up and forwardly, as the roll of tape unwinds, over the film strip ends until the end of the tape reaches the carriage bridge 44, and then the tape is then pressed down onto the upper surface of the film strips. The accurate positioning of the tape is critical to the success of the operation, and can be effected by aligning the guide line M on the tape with a related guide line M' imprinted on the upper surface of the rear cutting block, as seen in FIGURES 6 and 7.

When the tape is properly positioned on the upper surface of the film strips it will be noted that the forward or leading portions of the tape slots P of one row are disposed over and in horizontal alignment with the film sprocket holes, as well as the carriage retaining pins, while the rear or trailing portions of the tape slots extend rearwardly beyond the rear side edge of the film.

At this time the carriage is moved by the operator rearwardly from the first position to the second position, illustrated in FIGURE 8. It will be noted that when the carriage is in the second position the film is disposed to extend transversely over the rear cutting block, rearwardly of deck opening 19.

As the carriage is moved from the first to the second position, the portion of the tape lying rearwardly of the film is wrapped around the rear side edge of the film and against the underside of the film strips, as best seen in FIGURE 10, with the trailing portion of the tape slots now underlying the film sprocket holes.

Thus the film strip ends have been joined to each other by wrapping them with a band of tape, and because of the arrangement of the elongated tape holes or slots, the film sprocket holes are still free and uncovered.

All that remains to be done to complete the splicing operation is to trim the excess tape which is projecting from the forward side edges of the film strips. This is accomplished by again lowering the cutting head and striking it, so the rear cutting blade 48 will sever the tape at the forward side edge of the film.

After a splicing operation has been completed, the carriage is returned from the second position to the first position and the cycle of steps can be repeated for another splice.

Thus, it will be seen that the novel sliding film carriage and perforated tape cooperate to produce a simple and efficient film splice with a minimum amount of effort and material.

I claim:

1. A device for splicing adjacent ends of a pair of motion picture film strips, having at one side thereof a line of longitudinally spaced sprocket holes, by wrapping them with a band of transparent, adhesive tape from roll stock, having longitudinally spaced, transversely extending rows each including a plurality of elongated slots extending lengthwise of the tape and spaced from each other transversely of the tape a distance equal to the spacing of the film sprocket holes, comprising:
    (a) a base including:
        (i) a stationary member having a deck with a slot therein; and
        (ii) a movable member pivotally connected to said stationary member and having means for rotatably supporting a roll of transparent, adhesive tape thereon adjacent said deck;
    (b) said deck including:
        (i) a fixed section lying in a horizontal plane adjacent one side of said slot; and (ii) a pivotal section hinged adjacent one side for movement between a closed position, wherein it is in a horizontal position substantially co-planar with said fixed section and another side is disposed adjacent the opposite side of said slot, and an open position, wherein it is inclined upwardly adjacent said fixed section to provide an opening of substantially greater dimension than the slot between said deck sections and thereby afford access to said tape;

(c) a film holding carriage movably mounted on the fixed section of said deck for transporting said film strips between one position located on the side of the deck slot remote from said roll of tape, and another position located on the side of the deck slot adjacent said roll of tape;

(d) means for positioning said film strip ends on said carriage in end-to-end, abutting relation with the side of the film having the sprocket holes being nearest to the roll of tape;

(e) means for feeding a free end of the tape from said roll up through said deck opening when said pivotal section is in open position across said film strip ends, when the film strips are in said one position, with portions of the tape slots of one row overlying related film sprocket holes in said film strip ends;

(f) means for moving said film strips across said deck slot when said pivotal section is in closed position, so that as the film strips move from said one position to said other position the tape will be wrapped around said film strip ends with the remaining portions of the tape slots of said one row underlying the related film sprocket holes; and (g) cutting means mounted in said base movable member for trimming the excess tape from the side of the film remote from the line of sprocket holes.

2. A device for splicing adjacent ends of a pair of motion picture film strips, having at one side thereof a line of longitudinally spaced sprocket holes, by wrapping them with a band of transparent, adhesive tape from roll stock, having longitudinally spaced, transversely extending rows each including a plurality of elongated slots extending lengthwise of the tape and spaced from each other transversely of the tape a distance equal to the spacing of the film sprocket holes, comprising:

(a) a base having a deck with a slot therein;
(b) said deck including:
(i) a fixed section lying in a horizontal plane adjacent one side of said slot; and
(ii) a pivotal section hinged adjacent one side for movement between a closed position, wherein it is in a horizontal position substantially co-planar with said fixed section and another side is disposed adjacent the opposite side of said slot, and an open position, wherein it is inclined upwardly adjacent said fixed section to provide an opening of substantially greater dimension than the slot between said deck sections and thereby afford access to said tape;

(c) means for rotatably supporting a roll of tape on said base adjacent said deck;

(d) a film holding carriage movably mounted on said deck for transporting said film strips between one position located on the side of the deck slot remote from said roll of tape, and another position located on the side of the deck slot adjacent said roll of tape;

(e) means for positioning said film strip ends on said carriage in end-to-end, abutting relation with the side of the film having the sprocket holes being nearest to the roll of tape;

(f) means for feeding a free end of the tape from said roll up through said deck opening when said pivotal section is in open position across said film strip ends, when the film strips are in said one position, with portions of the tape slots of one row overlying related film sprocket holes in said film strip ends;

(g) means for moving said film strips across said deck slot when said pivotal section is in closed position so that as the film strips move from said one position to said other position the tape will be wrapped around said film strip ends with the remaining portions of the tape slots of said one row underlying the related film sprocket holes; and (h) means for trimming the excess tape from the side of the film remote from the line of sprocket holes.

3. A device for splicing adjacent ends of a pair of motion picture film strips, having at one side thereof a line of longitudinally spaced sprocket holes, by wrapping them with a band of transparent, adhesive tape from roll stock, having longitudinally spaced, transversely extending rows each including a plurality of elongated slots extending lengthwise of the tape and spaced from each other transversely of the tape a distance equal to the spacing of the film sprocket holes, comprising:

(a) a base including:
(i) a stationary member having a deck with a slot therein; and
(ii) a movable member pivotally connected to said stationary member and having means for rotatably supporting a roll of transparent, adhesive tape thereon adjacent said deck;

(b) said deck including:
(i) a fixed section lying in a horizontal plane adjacent one side of said slot; and
(ii) a pivotal section hinged adjacent one side for movement between a closed position, wherein it is in a horizontal position substantially co-planar with said fixed section and another side is disposed adjacent the opposite side of said slot, and an open position, wherein it is inclined upwardly adjacent said fixed section to provide an opening of substantially greater dimension than the slot between said deck sections and thereby afford access to said tape;

(c) a film holding carriage movably mounted on said deck for transporting said film strips between one position located on the side of the deck slot remote from said roll of tape, and another position located on the side of the deck slot adjacent said roll of tape;

(d) means for positioning said film strip ends on said carriage in end-to-end, abutting relation with the side of the film having the sprocket holes being nearest to the roll of tape;

(e) means for feeding a free end of the tape from said roll up through said deck opening across said film strip ends, when the film strips are in said one position, with portions of the tape slots of one row overlying related film sprocket holes in said film strip ends; and (f) means for moving said film strips across said deck slot, so that as the film strips move from said one position to said other position the tape will be wrapped around said film strip ends with the remaining portions of the tape slots of said one row underlying the related film sprocket holes.

4. A device according to claim 3, wherein said base includes a stationary member presenting said deck and a movable member pivotally connected to said stationary member.

5. A device according to claim 4, wherein said movable member includes means for rotatably supporting a roll of tape thereon.

6. A device according to claim 4, wherein said movable member includes cutting means for trimming the excess tape from the side of the film remote from tthe line of sprocket holes.

7. A device for splicing adjacent ends of a pair of motion picture film strips, having at one side thereof a line of longitudinally spaced sprocket holes, by wrapping them with a band of transparent, adhesive tape, having a transversely extending row of elongated slots extending lengthwise of the tape and spaced from each other transversely of the tape a distance equal to the spacing of the film sprocket holes, comprising:
  (a) a base having a deck with a slot therein;
  (b) said deck including:
    (i) a fixed section lying in a horizontal plane adjacent one side of said slot; and
    (ii) a pivotal section hinged adjacent one side for movement between a closed position, wherein it is in a horizontal position substantially coplanar with said fixed section and another side is disposed adjacent the opposite side of said slot, and an open position, wherein it is inclined upwardly adjacent said fixed section to provide an opening of substantially greater dimension than the slot between said deck sections and thereby afford access to said tape;
  (c) a film holding carriage movably mounted on said deck for transporting said film strips between one position located on one side of the deck slot, and another position located on the other side of the deck slot;
  (d) means for positioning said film strip ends on said carriage in end-to-end, abutting relation;
  (e) means for feeding a free end of the tape up through said deck slot across said film strip ends, when the film strips are in said one position, with portions of the tape slots of said row overlying related film sprocket holes in said film strip ends; and
  (f) means for moving said film strips across said deck opening, so that as the film strips move from said one position to said other position the tape will be wrapped around said film strip ends with the remaining portions of the tape slots of said one row underlying the related film sprocket holes.

8. A device for splicing adjacent ends of a pair of motion picture film strips, having at one side thereof a line of longitudinally spaced sprocket holes, by wrapping them with a band of transparent, adhesive tape from roll stock, having longitudinally spaced, transversely extending rows each including a plurality of elongated slots extending lengthwise of the tape and spaced from each other transversely of the tape a distance equal to the spacing of the film sprocket holes, comprising:
  (a) a base having a deck with a slot therein;
  (b) said deck including:
    (i) a fixed section lying in a horizontal plane adjacent one side of said slot; and
    (ii) a pivotal section hinged adjacent one side for movement between a closed position, wherein it is in a horizontal position substantially coplanar with said fixed section and another side is disposed adjacent the opposite side of said slot, and an open position, wherein it is inclined upwardly adjacent said fixed section to provide an opening of substantially greater dimension than the slot between said deck sections and thereby afford access to said tape;
  (c) means for rotatably supporting a roll of tape on said base adjacent said deck;
  (d) a film holding carriage movably mounted on said deck for transporting said film strips between one position located on the deck remote from said roll of tape, and another position located on the deck adjacent said roll of tape;
  (e) means for positioning said film strip ends on said carriage in end-to-end, abutting relation with the side of the film having the sprocket holes being nearest to the roll of tape;
  (f) means for feeding a free end of the tape from said roll across said film strip ends, when the film strips are in said one position, with portions of the tape slots of one row overlying related film sprocket holes in said film strip ends; and
  (g) means for moving said carriage so that as the film strips move from said one position to said other position the tape will be wrapped around said film strip ends with the remaining portions of the tape slots of said one row underlying the related film sprocket holes.

9. A device for splicing adjacent ends of a pair of motion picture film strips, having at one side thereof a line of longitudinally spaced sprocket holes, by wrapping them with a band of transparent, adhesive tape having a transversely extending row of elongated slots extending lengthwise of the tape and spaced from each other transversely of the tape a distance equal to the spacing of the film sprocket holes, comprising:
  (a) a base having a deck with a slot therein;
  (b) said deck including:
    (i) a fixed section lying in a horizontal plane adjacent one side of said slot; and
    (ii) a pivotal section hinged adjacent one side for movement between a closed position, wherein it is in a horizontal position substantially coplanar with said fixed section and another side is disposed adjacent the opposite side of said slot, and an open position, wherein it is inclined upwardly adjacent said fixed section to provide an opening of substantially greater dimension than the slot between said deck sections and thereby afford access to said tape;
  (c) a film holding carriage movably mounted on said deck for transporting said film strips between one position located on one side of the deck and another position located on another side of the deck;
  (d) means for positioning said film strip ends on said carriage in end-to-end, abutting relation;
  (e) means for feeding a free end of the tape across said film strip ends, when the film strips are in said one position, with portions of the tape slots of said row overlying related film sprocket holes in said film strip ends; and
  (f) means for moving said carriage, so that as the film strips move from said one position to said other position the tape will be wrapped around said film strip ends with the remaining portions of the tape slots of said one row underlying the related film sprocket holes.

10. A device for splicing a pair of motion picture film strips, having spaced sprocket holes along one side thereof, in end-to-end relation by wrapping them with a band of transparent, adhesive tape having a transversely extending row of elongated slots extending lengthwise of the tape and spaced from each other transversely of the tape a distance equal to the spacing between the film strip sprocket holes, comprising:
  (a) a base with a horizontal deck having a slot extending therethrough;
  (b) said deck including:
    (i) a fixed section lying in a horizontal plane adjacent one side of said slot; and
    (ii) a pivotal section hinged adjacent one side for movement between a closed position, wherein it is in a horizontal position substantially coplanar with said fixed section and another side is disposed adjacent the opposite side of said slot, and an open position, wherein it is inclined upwardly adjacent said fixed section to provide an opening of substantially greater dimension than the slot between said deck sections and thereby afford access to said tape;
  (c) means for positioning the film strips on one side of the deck slot with the side of the film strips having the sprocket holes being nearest to said deck slot;
  (d) means for feeding an end of the tape up through said deck opening and over the film strips with leading portions of the tape slots overlying said film strip sprocket holes and in alignment therewith;
(e) means for passing the film strips over said deck slot to wrap the tape around said one side of the film strips and under the film strips with trailing portions of the tape slots underlying said film strip sprocket holes and in alignment therewith;
(f) means for trimming excess tape from the other side of said film strips.

11. A device for splicing a pair of motion picture film strips, having spaced sprocket holes along one side thereof, in end-to-end relation by wrapping them with a band of transparent, adhesive tape having a transversely extending row of elongated slots extending lengthwise of the tape and spaced from each other transversely of the tape a distance equal to the spacing between the film strip sprocket holes, comprising:
(a) a base with a horizontal deck having a slot extending therethrough;
(b) said deck including:
(i) a fixed section lying in a horizontal plane adjacent one side of said slot; and
(ii) a pivotal section hinged adjacent one side for movement between a closed position, wherein it is in a horizontal position substantially co-planar with said fixed section and another side is disposed adjacent the opposite side of said slot, and an open position, wherein it is inclined upwardly adjacent said fixed section to provide an opening of substantially greater dimension than the slot between said deck sections and thereby afford access to said tape;
(c) means for positioning the film strips on one side of the deck slot with the side of the film strips having the sprocket holes being nearest to said deck slot;
(d) means for feeding an end of the tape up through said deck opening and over the film strips with leading portions of the tape slots overlying said film strip sprocket holes and in alignment therewith; and
(e) means for passing the film strips over said deck opening to wrap the tape around said one side of the film strips and under the film strips with trailing portions of the tape slots underlying said film strip sprocket holes and in alignment therewith.

12. A device for splicing a pair of motion picture film strips, having spaced sprocket holes along one side thereof, in end-to-end relation by wrapping them with a band of transparent, adhesive tape having a transversely extending row of elongated slots extending lengthwise of the tape and spaced from each other transversely of the tape a distance equal to the spacing between the film strip sprocket holes, comprising:
(a) a base with a horizontal deck having a slot extending therethrough;
(b) said deck including:
(i) a fixed section lying in a horizontal plane adjacent one side of said slot; and
(ii) a pivotal section hinged adjacent one side for movement between a closed position, wherein it is in a horizontal position substantially co-planar with said fixed section and another side is disposed adjacent the opposite side of said slot, and an open position, wherein it is inclined upwardly adjacent said fixed section to provide an opening of substantially greater dimension than the slot between said deck sections and thereby afford access to said tape;
(c) means for positioning the film strips on one side of the deck slot;
(d) means for feeding an end of the tape up through said deck opening and over the film strips with portions of the tape slots overlying said film strip sprocket holes and in alignment therewith; and
(e) means for passing the film strips over said deck slot to wrap the tape around said film strips with other portions of the tape slots underlying said film strip sprocket holes and in alignment therewith.

13. A device for splicing a pair of strips of material, in end-to-end relation by wrapping them with a band of transparent, adhesive tape, comprising:
(a) a base with a horizontal deck having a slot extending therethrough;
(b) said deck including:
(i) a fixed section lying in a horizontal plane adjacent one side of said slot; and
(ii) a pivotal section hinged adjacent one side for movement between a closed position, wherein it is in a horizontal position substantially co-planar with said fixed section and another side is disposed adjacent the opposite side of said slot, and an open position, wherein it is inclined upwardly adjacent said fixed section to provide an opening of substantially greater dimension than the slot between said deck sections and thereby afford access to said tape;
(c) means for positioning the strips on one side of the deck slot;
(d) means for feeding an end of the tape up through said deck opening and over the strips;
(e) means for passing the strips over said deck slot to wrap the tape around said film strips; and
(f) means for trimming excess tape from the other side of said film strips.

14. A device for splicing a pair of strips of material in end-to-end relation by wrapping them with a band of adhesive tape, comprising:
(a) a base with a horizontal deck having a slot extending therethrough;
(b) said deck including:
(i) a fixed section lying in a horizontal plane adjacent one side of said slot; and
(ii) a movable section adjacent the other side of said slot disposed for movement between a closed position, wherein it is in a horizontal position substantially co-planar with said fixed section and adjacent said slot, and an open position to provide an opening of substantially greater dimension than the slot between said deck sections and thereby afford access to said tape;
(c) means for positioning said strips on one side of the deck slot;
(d) means for feeding an end of the tape up through said deck opening and over said strips;
(e) means for passing said strips over said deck slot to wrap the tape around said strip; and
(f) means for turning excess tape from at least one side of said strips.

References Cited by the Examiner
UNITED STATES PATENTS

| | | | |
|---|---|---|---|
| 2,314,146 | 3/1943 | Katz | 206—59 |
| 2,764,501 | 9/1956 | Perri | 206—59 |
| 3,155,563 | 11/1964 | Jorgensen | 156—505 |
| 3,167,466 | 1/1965 | Lapersonne | 156—505 |

EARL M. BERGERT, *Primary Examiner.*
DOUGLAS J. DRUMMOND, *Examiner.*